United States Patent [19]
Davidovits

[11] Patent Number: 5,925,449
[45] Date of Patent: Jul. 20, 1999

[54] METHOD FOR BONDING FIBER REINFORCEMENT ON CONCRETE AND STEEL STRUCTURES AND RESULTANT PRODUCTS

[76] Inventor: Joseph Davidovits, 16 rue Galilee, F-02100 Saint-Quentin, France

[21] Appl. No.: 08/772,875

[22] Filed: Dec. 26, 1996

[51] Int. Cl.⁶ .......................... B32B 13/02; C01B 33/32; B05D 1/36
[52] U.S. Cl. ...................................... 428/297.4; 428/293.1; 423/328.1; 423/329.1; 423/332; 427/403
[58] Field of Search .............. 428/293.1, 293.4, 428/297.4, 297.7, 703, 469, 471, 802, 40.1, 105, 472, 446, 450; 427/403, 567; 52/721.1, 740.1, 725; 29/897.34, 897.3; 423/328.1, 329.1, 332; 106/643; 501/5, 6

[56] References Cited

U.S. PATENT DOCUMENTS

| | | | |
|---|---|---|---|
| 4,349,386 | 9/1982 | Davidovits | 106/85 |
| 4,888,311 | 12/1989 | Davidovits et al. | 501/95 |
| 5,132,169 | 7/1992 | Olry et al. | 428/300 |
| 5,244,726 | 9/1993 | Laney et al. | 428/312.6 |
| 5,342,595 | 8/1994 | Davidovits et al. | 423/328.1 |
| 5,352,427 | 10/1994 | Davidovits et al. | 423/328.1 |
| 5,607,527 | 3/1997 | Isley, Jr. | 156/71 |
| 5,635,263 | 6/1997 | Saito | 428/40.1 |
| 5,798,307 | 8/1998 | Davidovits et al. | 501/95.2 |

FOREIGN PATENT DOCUMENTS

WO 96/23898  9/1996  France .

*Primary Examiner*—Deborah Jones
*Assistant Examiner*—Stephen Stein
*Attorney, Agent, or Firm*—Sheridan Neimark

[57] ABSTRACT

Fiber-reinforced geopolymeric resin having a mole ratio of $SiO_2:Al_2O_3$ of at least equal to 6, and preferably at least equal to 10, adheres well to both concrete and steel, and is used to protectively cover infrastructures formed of steel-reinforced concrete and the like.

16 Claims, No Drawings

METHOD FOR BONDING FIBER REINFORCEMENT ON CONCRETE AND STEEL STRUCTURES AND RESULTANT PRODUCTS

FIELD OF THE INVENTION

The present invention relates to improvements in protecting and restoring steel and concrete structures, particularly steel reinforced concrete which has undergone degradation due to environmental exposure. More particularly, the present invention relates to the use of fiber reinforced composites with geopolymeric matrices of the aluminosilicate type for such purpose, and the resulting structures thus obtained.

BACKGROUND OF THE INVENTION

Infrastructure in the United States such as bridges are degrading due to the corrosion of steel-reinforced concrete and steel structures by salty water and de-icing compounds. During the last years, structural retrofit work has come to the forefront of industry practice in response to the problems of an aging infrastructure and aging buildings worldwide. A type of repair frequently proposed to enhance the seismic resistance of bridge columns is the use of externally bonded sheets of fibers or the wrapping with filaments. For example, in Japan, retrofit applications for building and bridge columns were developed using carbon fibers and epoxy resin. In other countries, in particular in cold-climate countries, the corrosion effect of de-icing salts has a quite devastating consequence on the civil engineering structures. The repair and rehabilitation of these structures have become major challenges for the industry.

One recently proposed repair method consists of externally bonding flexible sheets of fiber composites with organic glues and resins. Another application for continuous fiber composites in infrastructure is the wrapping of concrete columns with continuous fibers with an organic matrix, to reinforce new construction and damaged bridges and buildings in earthquake and hurricane prone areas. The flammability of the organic polymer matrix of such fiber-reinforced composites limits the use of these materials in exposed interior building columns where flammability is a serious concern. Furthermore, even for outside uses, this susceptibility to fire currently limits the use of polymer composites in infrastructure, precluding any useful advantage in specific strength/stiffness and corrosion resistance compared to steel or concrete.

Thus, the major disadvantage of organic matrix fiber-composites is their lack of fire resistance and degradation under UV light leading to long-term durability problems. The carbon and glass fabrics can withstand normal fire exposure and are durable under UV light. But the weak link is the organic polymers used to attach these fabrics to concrete. It is also known that the most common failure pattern for concrete structures externally reinforced with organic matrix fibers or sheets, is their failure by delamination of fabrics at the interface of the concrete and fabrics. Delamination failure under utilizes the composite strength. Furthermore, this type of failure must be avoided in order to provide warning of the impending failure.

A variety of geopolymer resins are known, such as those disclosed in the Davidovits U.S. Pat. Nos. 4,349,386; 4,888,311; 5,342,595 and 5,352,427. Geopolymeric resins have been known for use as matrices in the manufacture of geopolymeric composites, e.g. fibers reinforcement composed of carbon fiber or graphite in a geopolymeric matrix (WO 88/02741, WO 91/13830, WO 91/13840, U.S. Pat. No. 4,888,311, U.S. Pat. No. 5,342,595, U.S. Pat. No. 5,352,427). Fiber reinforced composites with geopolymeric matrices of the aluminosilicate type described in the prior art do not ignite, burn, or release any smoke even after extended heat flux exposure. In general, geopolymer composites of the prior art are used to manufacture fire-resistant panels or structures for use in offshore oil platforms, military vehicles, aircraft and ground transportation, where fire endurance and firehazard are important. They are also used to manufacture items which work at temperatures ranging between 400° C. and 1000° C., for example devices for the casting of molten aluminum. However, the prior geopolymer resins of the above-mentioned documents have been found to not adhere well to iron, steel or concrete.

COPENDING APPLICATION

In copending application PCT/FR96/00388, filed Mar. 15, 1995, and published as WO 96/28398, now U.S. Pat. No. 5,798,307 a new geopolymeric resin is disclosed which is particularly suitable, and thus provides excellent geopolymeric matrices, for the production of fiber reinforced composite materials. The composition of this new geopolymeric matrix, expressed as oxides after dehydration, is as follows: $yM_2O:Al_2O_3:xSiO_2$, where "x" is 6.5–70, "y" is 0.95–9.50 and M is Na, K or Na+K. Such a geopolymeric matrix comprises a nanocomposite material with at least two phases, namely (a) a first nodular silicious phase composed of nanospheres with diameters of less than 1 micron, preferably less than 500 nm, and (b) a second polymeric phase essentially composed of alkaline poly(aluminosilicate) having one or more sialate bridge (—Si—O—Al—O) cross-linking sites of total formula $M_4Si_2AlO_{10}$ to $M_2Si_4AlO_{16}$, such that, in the alkaline poly(aluminosilicate), the ratio of $Si(O_4)$ to $Al(O_4)$ is >3.5, preferably >5. The geopolymeric matrix has a spectrum of $^{29}Si$ MASNMR with three resonance regions: −87±5 ppm, −98 +5 ppm, −107+5 ppm, and prevents the oxidation at high temperatures of the reinforcing carbon fiber. The resulting composite materials can be used at temperatures of up to 1000° C. The contents of U.S. Pat. No. 5,798,307 are hereby incorporated by reference.

SUMMARY OF INVENTION

It is an object of the present invention to provide for improved protection against corrosion of steel-reinforced concrete and steel structures.

It is another object of the present invention to provide for more effective repair and subsequent protection of steel-reinforced concrete structures which have already undergone significant degradation due to corrosion.

It is a further object of the invention to provide an improved method of bonding fiber reinforcement on concrete and steel structures.

It is still another object of the present invention to provide steel-reinforced concrete and steel structures which are reinforced and protected by geopolymeric fiber-reinforced matrices.

Based on the aforementioned deficiencies of the prior art, an investigation was undertaken to evaluate the use of a new geopolymer composite which was developed recently. This alumino-silicate matrix for composites described in the co-pending application PCT/FR96/00388, now U.S. Pat. No. 5,798,307 differs from those employed in the prior art, since it specifies the use of fibrous reinforcement composed of carbon fiber or graphite which can be used at temperature up to 10000° C. For geopolymeric matrices in the prior art (WO 88/02741, WO 91/13830, WO 91/13840, U.S. Pat. No. 4,888,311, U.S. Pat. No. 5,342,595, U.S. Pat. No. 5,352,427), it is known that use of carbon fiber is limited to temperatures lower than 450° C., because above this temperature, the carbon oxidizes and the mechanical strength of the reinforcement diminishes considerably.

The above and other objects of the present invention are thus achieved by the use of geopolymeric bonding resins having excellent adhesion to concrete and steel surfaces, and in the interlaminar planes of fabrics. This invention is based on the surprising discovery that geopolymeric matrix fiber composites as disclosed in U.S. Pat. No. 5,798,307 not only do not burn, but adhere to concrete more effectively than organic materials, leading to their use in strengthening both new concrete structures and enhancing old concrete structures.

According to the method of the present invention, when a geopolymeric bonding resin comprises a geopolymeric compound with a mole ratio $SiO_2:Al_2O_3$ at least equal to 6, as disclosed in U.S. Pat. No. 5,798,307, the externally applied composite reinforcement will not peel-off the surface of concrete. In addition, such a geopolymer adheres very well to steel and iron, and therefore fiber-reinforced composites using such a geopolymeric resin are highly suitable for application to steel-reinforced concrete and steel structures as repairs and protective coatings.

DETAILED DESCRIPTION OF EMBODIMENTS

It has now been discovered that the new geopolymer matrix described in U.S. Pat. No. 5,798,307 provides an excellent bonding between the composite and the surface of concrete or iron and steel. This has been surprising because the geopolymer of the prior art did not adhere to these materials; see for example, in U.S. Pat. No. 4,349,386. A second surprising result of the method described in this invention was to discover that despite of weaker intrinsic mechanical properties in comparison with organic resins, this new geopolymer resin provides a reinforcement to concrete beams which is as good or even better than values currently obtained with epoxy resin.

In one of the preferred methods described in the examples for externally bonding sheets of carbon fiber composites on concrete according to this invention, the mole ratio $SiO_2:Al_2O_3$ is at least equal to 10. The resulting geopolymer resin carbon-fiber reinforcement provides a better structural performance than an equivalent epoxy resin carbon-fiber reinforcement.

Not every geopolymer resin of the prior art is suitable for bonding fibrous reinforcement sheets on concrete and steel structures. Poly(sialate siloxo) (—Si—O—Al—O—Si—O—) type resins for example do not adhere to iron or steel or concrete. For example, in U.S. Pat. No. 4,349,386, col. 5, line 53, describing the casting into a mold of (Na, K)PSS alumino-silicate reactant mixture, iron is a material from which a mold may be made, and the product does not adhere to the mold. It has been now discovered that bonding to iron and concrete is provided when the geopolymeric resin contains a hydrated siliceous phase, similar to silica gel, which has a nuclear magnetic resonance spectrum $^{29}Si$ MASNMR with two major peaks at 98±5 ppm and –110±5 ppm. It is generally assumed that bonding results from the interaction of polysilicates reacting silanol groups –20 SiOH $(^{-)}Me^{(+)}$, Me being Na and/or K, with iron-hydroxide and/or calcium silicate hydrate. In geopolymeric compound with mole ratios $SiO_2:Al_{22}O_3$ being at most equal to 6, the alkaline cations Na, K, are tied to the $Al(O_4)$ three dimensional networking group and are therefore not available for any bonding interaction.

Hardening of the geopolymeric resin is provided by external radiant heat, for cure at about 60° C. to 80° C., preferably at an optimum temperature of about 80° C. At this optimum temperature, curing is normally completed in about one to three hours, or more if desired, although for small quantities of geopolymeric resin the cure may be completed in about 15 minutes. At lower temperatures, the curing rate is reduced, and the time required to complete curing will be longer.

The following examples serve to further illustrate the invention. They have no limiting character on the scope of the invention as presented in the claims.

To illustrate the method of the invention, five reinforced concrete beams that were 3200 mm long, 200 mm wide, 300 mm deep were constructed. These beams were tested over a simply supported span of 3000 mm. The tension reinforcement consisted of 2 #4 reinforcing bars. The tension reinforcement was kept to a minimum, in order to avoid the shear failure of strengthened beams. The 28 day compressive strength of the concrete was about 43 MPa. The control cylinders made with all four beams provided consistent compressive strength results. After a 31 day curing period of the concrete beams, the bottom surface of the beams were roughened, first by dry grinding followed by sand blasting. These operations removed the weak mortar layer, exposing some aggregates.

Two beams were strengthened with 3 layers of unidirectional T300 carbon fibers fabric and a room temperature hardening epoxy resin (Example 1). Two other beams were strengthened with 3 layers of the same unidirectional T300 carbon fibers fabric and the geopolymer resin described in Example 1 of U.S. Pat. No. 5,798,307 (Example 2).

The geopolymer resin in question was formed from a reaction mixture containing: $H_2O$:3.5 moles; $K_2O$:0.276 moles; $SiO_2$:2.509 moles; $Al_2O_3$:0.039 moles. The $Al_2O_3$ was from an amorphous aluminosilicate oxide prepared by electrofusion of natural alumino-silicate, its mean formula lying between $(24SiO_2, AlO_2)$ and $(34 SiO_2, AlO_2)$; the $SiO_2$ came from this aluminosilicate oxide and a solution of potassium silicate with a mole ratio of $K_2O/SiO_2$ close to 1; $K_2O$ came from potassium silicate. The mole ratios of reacting oxides were:

$K_2O/SiO_2$ 0.11

$SiO_2/Al_2O_3$ 64.33

$K_2O/Al_2O_3$ 7.07

The mixture was allowed to stand for 1 to 2 hours and afterwards used to impregnate the carbon fiber fabric of Example 2 below.

A summary of comparative results is presented in Table 1, which shows loads corresponding to yield and final and mid-span deflections at failure.

EXAMPLE 1

With Organic Epoxy Resin Bonding

The rough surface of two beams was primed with an organic epoxy coating and allowed to dry for two hours. The epoxy resin was then applied to the concrete surface using a roller. Room temperature tensile strength of the cured epoxy resin was 60 Mpa, and the room temperature flexural strength of the corresponding carbon-fiber lamina was 1100 MPa. The fabric was positioned and pressed down evenly with a roller. Another coat of epoxy resin was then applied to impregnate the sheet. After 24 hours of curing of the first sheet, the two other sheets were bonded in a similar manner. After a 7 day curing period, the beams were tested. The load to final failure was 8.21 metric tonnes (See Table 1).

EXAMPLE 2

With Geopolymer Resin Bonding (Described in Example 1 of U.S. Pat. No. 5,798,307)

The rough surface of the other two beams was primed with a mixture of the geopolymer resin to avoid the loss of geopolymer due to migration from fabrics to voids in the concrete. Room temperature tensile strength of the cured geopolymer resin was 15 Mpa, and the room temperature flexural strength of the corresponding 10 carbon-fiber lamina was 600 Mpa. The fabrics themselves were pregged using hand pre-pregging and placed at the bottom surface of the beam, one after the other and pressed down evenly with a roller. The beams were allowed to dry for 24 hours and heated to 80° C. (radiant heating) to cure the geopolymer for 24 hours and eventually subjected to the test. The load to final failure was 9.30 metric tonnes. (See Table 1).

TABLE 1

Summary of concrete beam test results

| Beam design | resin tensile Mpa | Failure Load metric tonnes | Deflection at Failure, cm | Mode of failure composite |
|---|---|---|---|---|
| Control | — | 7.25 | 8.8 | yielding of steel |
| Example 1 epoxy bonding | 60 | 8.21 | 2.8 | peeling off delamination |
| Example 2 geopolymer bonding | 15 | 9.30 | 2.3 | rupture of composite |

Despite lower intrinsic mechanical properties, the results indicate that the carbon fiber reinforcement bonded with geopolymer provides excellent and better adhesion both to concrete surface and in the interlaminar planes of the reinforcing fabrics. The two beams reinforced with geopolymer bonded composite failed by rupturing the fabrics. The test carried out with epoxy resin confirms that the most common failure pattern with organic bonded composites is by delamination of fabrics at the interface of concrete and fabrics.

The method described in this invention shows that good adhesion to concrete and/or to steel is obtained with bonding based on the geopolymer resin described in Example 1 of U.S. Pat. No. 5,798,307 and used above in Example 2 of this invention. It is generally assumed that bonding results from the interaction of polysilicates reacting silanol groups —SiOH$^{(-)}$ Me$^{(+)}$, Me being Na and/or K, with iron-hydroxide and/or calcium silicate hydrate. The comparison of the physical properties of the geopolymer resin of the prior art with the resin utilized in the above Example 2 provides an explanation.

It has been now discovered that bonding to iron and concrete is provided when the geopolymeric compound contains a hydrated siliceous phase, similar to silica gel, which has a nuclear magnetic resonance spectrum $^{29}$Si MASNMR with two major peaks at −98±5 ppm and −110±5 ppm. The peak at −98±5 ppm characterizes reacting silanol groups —SiOH$^{(-)}$ Me$^{(+)}$, i.e. 10 $Q_3$ (3Si, 1OH) groups whereas the peak at −110±5 ppm characterizes $Q^4$ (4Si) silica. The geopolymer resins disclosed WO 96/28398 do display $^{29}$Si MASNMR with two major peaks at −98±5 ppm and −110±5 ppm. This siliceous phase is found in geopolymeric compounds that contain alumino siliceous nano-spheres of composition between (2SiO$_2$, AlO$_2$) and (34SiO$_2$, AlO$_2$) and have ratios SiO$_2$/Al$_2$O$_3$>6.5 and M$_2$O/Al$_2$O$_3$>1.3.

A geopolymer resin of the prior art disclosed in U.S. Pat. No. 5,352,427 could also be used in the method described in the present invention. However, this fluoro alumino-silicate binder may not be utilized because of environmental concerns related to the high amount of fluor in the binder. On the other hand, in geopolymeric compound with mole ratios SiO$_2$:Al$_2$O$_3$ being at most equal to 6 (U.S. Pat. No. 4,888,311, U.S. Pat. No. 5,342,595), the alkaline cations Na, K, are tied to the Al(O$_4$) three dimensional networking group and are therefore not available for any bonding interaction.

As indicated above, curing of the geopolymer resin described in example 2 above requires the implementation of heating devices such as heating blankets or infrared radiant heaters.

EXAMPLE 3

A steel-reinforced concrete beam was roughened, first by dry grinding followed by sand blasting. The rough surface was primed with a mixture of the geopolymer resin of example 2. A glass fiber fabric was pregged using hand pre-pregging and placed at the bottom surface of the beam, and pressed down evenly with a roller. The beam was allowed to dry for 24 hours and heated to 80° C. (radiant heating) to cure the geopolymer for 24 hours. A surface that is resistant to the chemical corrosion of de-icing salts was thus obtained. Furthermore, the surface was very hard and difficult to destroy by human vandalism. It cannot be impregnated with organic solvent and therefore cannot be painted over with typical organic paints which require penetration.

EXAMPLE 4

The method of the present invention can also be applied for the repair of corroded steel structures. The cleaned surface of a corroded steel beam was coated with a mixture of the geopolymer resin of Example 2. A glass fiber fabric was pregged using hand pre-pregging and placed at the bottom surface of the beam, and pressed down evenly with a roller. The beam was allowed to dry for 24 hours and heated to 80° C. (radiant heating) to cure the geopolymer for 24 hours. The measured bonding strength of the reinforced fabric on steel was 11 Mpa. The surface of the covered beam had the same properties as Example 3.

Similar results to Example 3 and Example 4 are also obtained with any kind of cheap mineral fiber reinforcing material, for example aluminum oxide fiber, or with any kind of organic fiber (polypropylene, polyamide, polyethylene, polyester, polyacryl-nitrile, cellulose, cotton, and others).

Hence, according to the methods described in this invention, it can be stated that geopolymeric bonding provides as good or better adhesion in comparison with organic polymers. In addition, geopolymer bonded fiber reinforcements are fire resistant, and do not degrade under UV light. They are chemically compatible with concrete and iron, resistant to the chemical corrosion of de-icing salts and difficult to destroy by human vandalism. Geopolymer resins are water based and no special protective equipment other than gloves is needed by the workers. Excess material can be discarded as ordinary waste. This aspect is very important during the repair and retrofit phase.

Naturally, various modifications can be introduced to the methods and the fiber reinforcements described above, by workers in the field, while remaining within the terms of the invention.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. In a method for bonding a resin impregnated fiber reinforcement onto a substrate structure formed of at least one of concrete and steel, comprising applying said fiber reinforced resin to said substrate structure and curing said resin, the improvement wherein said resin is a geopolymeric bonding resin with a mole ratio $SiO_2:Al_2O_3$ of at least 6 and a mole ratio $M_2O:Al_2O_3$ of at least 1.3, wherein M is at least one of Na and K.

2. Method according to claim 1, wherein said geopolymeric bonding resin has a mole ratio $SiO_2:Al_2O_3$ at least equal to 10.

3. Method for externally bonding fiber reinforcement on concrete and steel structures according to claim 2, wherein said geopolymeric bonding resin contains a hydrated siliceous phase which has a nuclear magnetic resonance spectrum $^{29}Si$ MASNMR with two major peaks at 98±5 ppm and −110±5 ppm.

4. A method according to claim 3, comprising heat curing said geopolymeric bonding resin by applying radiant heat at 60–80° C.

5. A method according to claim 4, wherein said substrate structure comprises steel-reinforced concrete which has become degraded by corrosion.

6. A method according to claim 1, comprising heat curing said geopolymeric bonding resin by applying radiant heat at 60–80° C.

7. A method according to claim 1, wherein said substrate structure comprises steel-reinforced concrete which has become degraded by corrosion.

8. A method according to claim 1, wherein the maximum mole ratio of $SiO_2:AlO_2$ is 34.

9. In a method for externally bonding a resin impregnated fiber reinforcement onto a substrate structure of concrete and steel, comprising applying said fiber reinforced resin to said substrate structure and curing said resin, the improvement wherein said resin is a geopolymeric bonding resin with a mole ratio $SiO_2:Al_2O_3$ of at least 6 and a mole ratio $M_2O:Al_2O_3$ of at least 1.3, wherein M is at least one of Na and K, and contains a hydrated siliceous phase which has a nuclear magnetic resonance spectrum $^{29}Si$ MASNMR with two major peaks at 98±ppm and −110±5 ppm.

10. Method according to claim 9, wherein said geopolymeric bonding resin has a mole ratio $SiO_2:Al_2O_3$ at least equal to 10.

11. A method according to claim 9, comprising heat curing said geopolymeric bonding resin by applying radiant heat at 60–80° c.

12. A structure comprising a substrate formed of at least one of concrete, iron and steel, at least partly covered and protected by fiber reinforced geopolymeric bonding resin adhered thereto, said geopolymeric bonding resin having a mole ratio $SiO_2:Al_2O_3$ of at least 6 and a mole ratio $M_2O:Al_2O_3$ of at least 1.3, wherein M is at least one of Na and K.

13. A structure according to claim 12, wherein said geopolymeric bonding resin has a mole ratio $SiO_2:Al_2O_3$ of at least 10.

14. A structure according to claim 12, wherein said geopolymeric bonding resin contains a hydrated siliceous phase having a nuclear magnetic resonance spectrum $^{29}Si$ MASNMR with two major peaks at 98±5 ppm and −110±5 ppm.

15. A structure according to claim 12, formed of steel-reinforced concrete which has become degraded by corrosion.

16. A structure according to claim 12 wherein, in said geopolymeric bonding resin, the mole ratio of $SiO_2:AlO_2$ is 34.

* * * * *